No. 678,328. Patented July 9, 1901.
J. E. BANCROFT.
WASHING AND SCALDING APPARATUS FOR FRUIT.
(Application filed Nov. 7, 1900.)
(No Model.) 2 Sheets—Sheet 1.
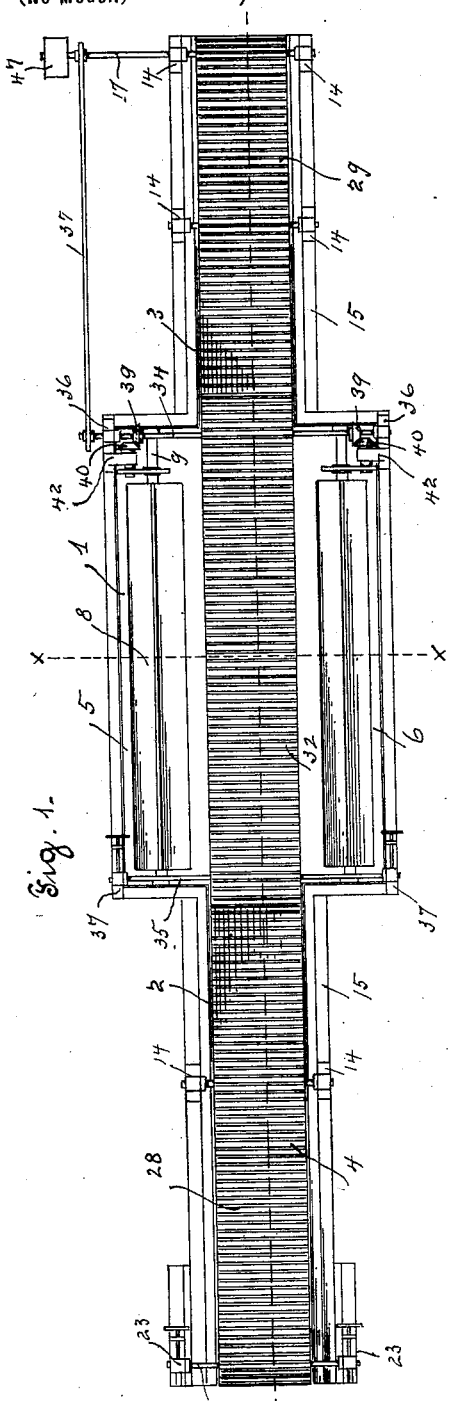
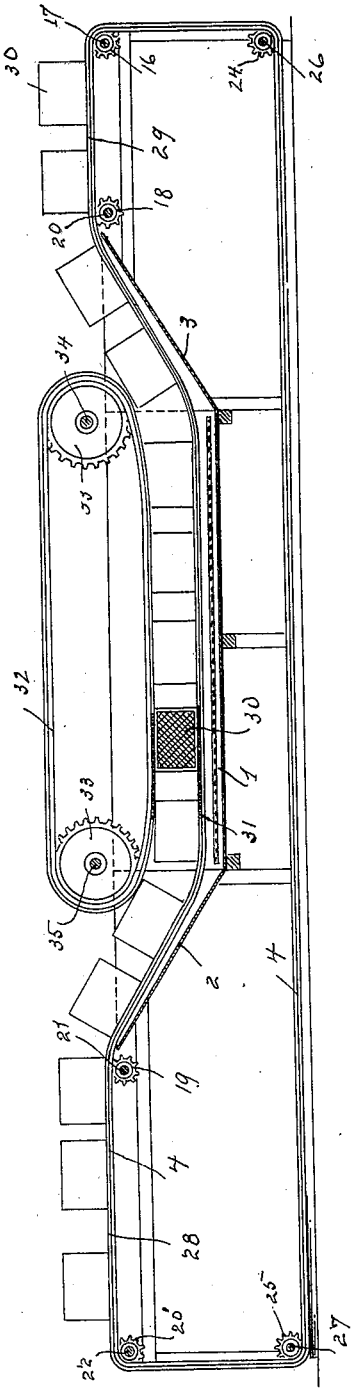
Witnesses Inventor
James E. Bancroft No. 678,328. Patented July 9, 1901.
J. E. BANCROFT.
WASHING AND SCALDING APPARATUS FOR FRUIT.
(Application filed Nov. 7, 1900.)
(No Model.) 2 Sheets—Sheet 2.
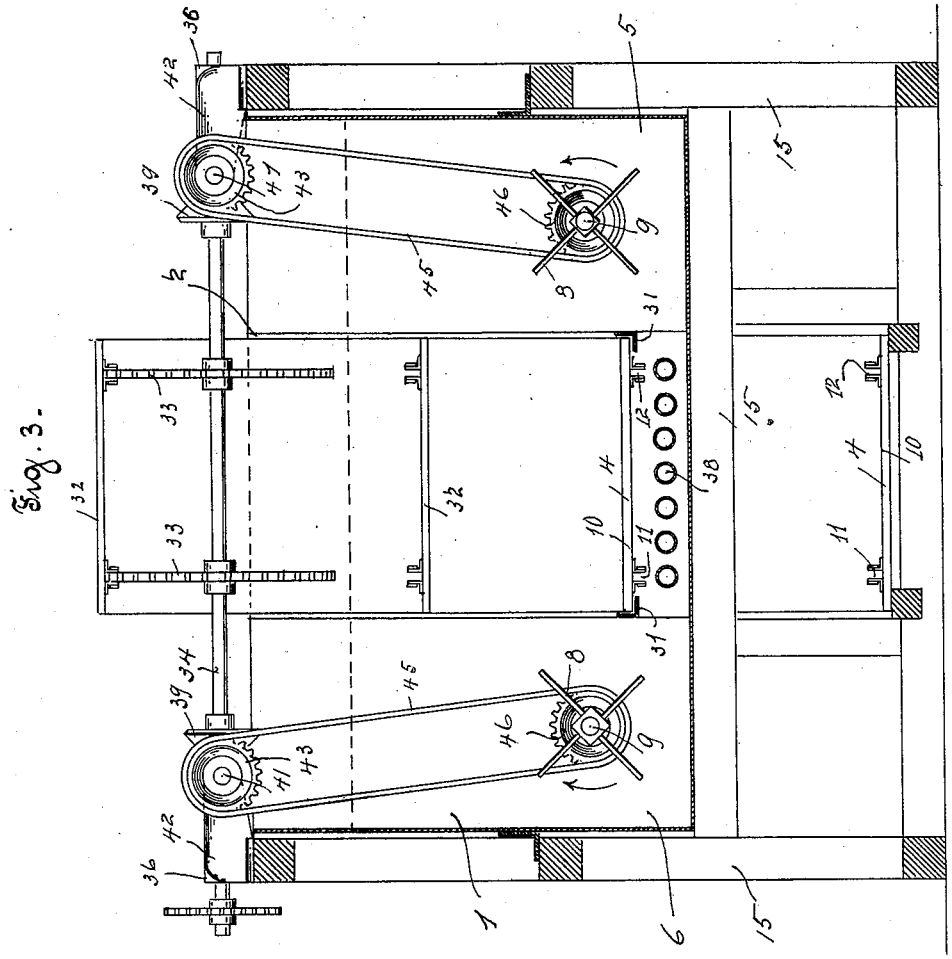

UNITED STATES PATENT OFFICE.

JAMES E. BANCROFT, OF TOLEDO, OHIO, ASSIGNOR TO THE INTERNATIONAL CANNING COMPANY, OF SAME PLACE.

WASHING AND SCALDING APPARATUS FOR FRUIT.

SPECIFICATION forming part of Letters Patent No. 678,328, dated July 9, 1901.

Application filed November 7, 1900. Serial No. 35,721. (No model.)

*To all whom it may concern:*

Be it known that I, JAMES E. BANCROFT, of Toledo, county of Lucas, and State of Ohio, have invented new and useful Improvements in a Washing and Scalding Apparatus for Fruit; and I do hereby declare that the following is a full, clear, and exact description thereof, which will enable others skilled in the art to which it appertains to make and use the same, reference being had to the accompanying drawings, and to the figures of reference marked thereon, which form part of this specification.

My invention relates to a washing and scalding apparatus for fruit, and has for its object to provide a mechanism adapted to rapidly and completely immerse fruit, which is packed in foraminous receptacles, into a tank of heated water for scalding and provide suitable means for agitating the water to wash and scald the fruit so packed by currents of water induced by the agitators.

In the drawings, Figure 1 is a plan view of an apparatus constructed in accordance with my invention. Fig. 2 is a longitudinal section through the same on the line $y\ y$. Fig. 3 is a transverse section on the line $x\ x$.

1 designates a tank with opposite-disposed inclines 2 and 3 and which are of a width to receive and allow the passage of a carrier 4, and by reason of the lesser width of the inclines pockets 5 and 6 are formed diametric to the line of travel of the carrier. In the aforesaid pockets there are located paddles 8, the shafts 9 of which are suitably journaled in bearings (not shown) near the bottom of the tank. The carrier is an endless belt and consists of slats 10, properly secured to sprocket-chains 11 and 12. The chains are supported upon and propelled by sprocket-wheels, which are mounted upon shafts revolving in bearings 14, disposed and secured to the frame 15 of the apparatus in the following order:

16 designates sprocket-wheels mounted upon the driven shaft 17, and 18 and 19 are idler-sprockets mounted upon shafts 20 and 21, respectively. 20' designates also idler-sprockets mounted upon the shaft 22. The latter shaft is journaled in lengthwise-movable bearings 23, of a usual construction for adjustment of the belt. Idler-sprockets 24 and 25 are mounted upon shafts 26 and 27, respectively, and may be omitted. By thus disposing the shafts and sprocket-wheels at the top of the machine a level loading-section 28 is formed upon one side of the tank, and upon the opposite side thereto a level portion 29 is formed for removing the receptacles 30 from the belt. Track-like supports for the slats of the belt are provided for in the form of L-bars 31, which are secured to the sides of the inclines leading to and from the tank and also continue through the tank, as shown in Fig. 2.

The receptacles 30, into which fruit is lightly packed, are formed of a foraminous material of a mesh to hold the fruit within and comprise top, bottom, and sides. For insuring the complete immersion of the fruit and prevent displacement of the receptacle from the carrier I have provided a belt 32, which is mounted upon the sprocket-wheels 33. The lattter are secured to shafts 34 and 35. The rigid bearings 36 and adjustable bearings 37 for the aforesaid shafts are secured to the frame of the apparatus transversely across the tank. The belt 32 is driven by means of a crossed chain 37 from the driving-shaft 17. The belts revolve inversely and at equal velocity, whereby the receptacles are held between the belts in immersed position during their travel through the water in the tank, which former is heated by means of a steam-coil 38, suitably disposed at the bottom of the tank. Upon the driven shaft 34 are mounted gears 39, which intermesh with component gears 40 to transmit motion to shafts 41 at right angles to the shaft 34. The shafts 41 are mounted in bearings 42, suitably secured to the frame of the apparatus. The shafts 41 have also mounted thereon sprocket-wheels 43, from which motion is transmitted to the paddle-shafts 9 by means of sprocket-chains 45, engaging the wheels 43, and wheels 46, mounted upon the paddle-shafts. By revolving the paddle-shafts in the directions indicated by the arrows the water is thrown inward against the fruit in the receptacle, whereby the fruit is thoroughly washed by the current of water and scalded in transit through the tank. Motion is transmitted to the pulley 47, which is mounted upon the shaft 17, from which the mechanism is actuated, and from the aforegoing it will be seen that I have provided an efficient apparatus for rapidly scalding and washing fruit in canneries.

What I claim is—

1. In a washing and scalding apparatus, a tank provided with heating apparatus, slanting inlet portions at opposite ends of the tank, rectangular pockets at the sides of the tank, agitators mounted to rotate in said pockets, a carrier-belt mounted to pass through and under the tank, said belt being adapted to convey foraminous receptacles through the heated and agitated body of water, and means to support and revolve said belt and agitators as described.

2. In a washing and scalding apparatus, a frame, a tank supported thereon provided with heating apparatus, slanting inlets secured to the tank of a width to form rectangular pockets in the tank upon both sides of the inlets, upon the frame a carrier-belt mounted and passing through and under the tank, arbors journaled over and across the tank having pulleys mounted thereto, a belt mounted upon the pulleys vertically over the carrier-belt and at a height to receive foraminous receptacles between the carrier and the upper belt, agitators journaled in the sides of the pockets to throw the water centrally to the tank, and means to transmit motion to the carrier-belt, submerging-belt and agitators.

In testimony that I claim the foregoing as my own I hereto affix my signature in presence of two witnesses.

JAMES E. BANCROFT.

Witnesses:
JESSIE CRAWFORD,
WM. K. TERRY.